(12) United States Patent
Lee et al.

(10) Patent No.: US 11,328,719 B2
(45) Date of Patent: May 10, 2022

(54) ELECTRONIC DEVICE AND METHOD FOR CONTROLLING THE ELECTRONIC DEVICE

(71) Applicant: SAMSUNG ELECTRONICS CO., LTD., Suwon-si (KR)

(72) Inventors: Jaehun Lee, Suwon-si (KR); Yunsu Lee, Suwon-si (KR); Taeho Hwang, Suwon-si (KR); Seungsoo Kang, Suwon-si (KR); Jiyoung Kang, Suwon-si (KR); Sejin Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 16/750,662

(22) Filed: Jan. 23, 2020

(65) Prior Publication Data

US 2020/0243089 A1 Jul. 30, 2020

(30) Foreign Application Priority Data

Jan. 25, 2019 (KR) .................. 10-2019-0009833

(51) Int. Cl.
*G10L 15/22* (2006.01)
*G06F 16/22* (2019.01)
(Continued)

(52) U.S. Cl.
CPC .......... *G10L 15/22* (2013.01); *G06F 16/2228* (2019.01); *G10L 15/08* (2013.01);
(Continued)

(58) Field of Classification Search
USPC ............... 704/231, 235, 246, 247, 251, 252
See application file for complete search history.

(56) References Cited

U.S. PATENT DOCUMENTS

| 7,406,459 B2 | 7/2008 | Chen et al. |
|---|---|---|
| 9,600,231 B1 | 3/2017 | Sun et al. |

(Continued)

FOREIGN PATENT DOCUMENTS

| KR | 10-2014-0050217 A | 4/2014 |
|---|---|---|
| KR | 10-2017-0033722 A | 3/2017 |

(Continued)

OTHER PUBLICATIONS

Search Report and Written Opinion dated May 19, 2020 in corresponding International Application No. PCT/KR2020/001019.

(Continued)

*Primary Examiner* — Leonard Saint Cyr
(74) *Attorney, Agent, or Firm* — Nixon & Vanderhye P.C.

(57) ABSTRACT

An electronic device and a method for controlling the electronic device is provided. The electronic device includes a microphone, a memory configured to include at least one instruction, and a processor configured to execute the at least one instruction. The processor is configured to control the electronic device to perform voice recognition for an inquiry based on receiving input of a user inquiry through the microphone, and acquire a text for the inquiry, generate a plurality of inquiries for acquiring response data for the inquiry from a plurality of databases using a relation graph indicating a relation between the acquired text and data stored in the plurality of databases, acquire response data corresponding to each of the plurality of inquiries from each of the plurality of databases, and generate a response for the inquiry based on the response data acquired from each of the plurality of databases and output the response.

18 Claims, 13 Drawing Sheets

(51) Int. Cl.
    *G10L 15/08* (2006.01)
    *G10L 15/30* (2013.01)
    *G06N 20/00* (2019.01)
(52) U.S. Cl.
    CPC .............. *G10L 15/30* (2013.01); *G06N 20/00* (2019.01); *G10L 2015/088* (2013.01); *G10L 2015/223* (2013.01)

(56) References Cited

U.S. PATENT DOCUMENTS

| | | |
|---|---|---|
| 9,899,021 B1 | 2/2018 | Vitaladevuni et al. |
| 2002/0087310 A1 | 7/2002 | Lee et al. |
| 2003/0078913 A1 | 4/2003 | McGreevy |
| 2016/0171122 A1 | 6/2016 | Tonshal et al. |
| 2016/0179934 A1 | 6/2016 | Stubley et al. |
| 2017/0024375 A1 | 1/2017 | Hakkani-Tur et al. |
| 2017/0084274 A1 | 3/2017 | Kim et al. |
| 2017/0200455 A1 | 7/2017 | Aggarwal et al. |
| 2017/0236229 A1 | 8/2017 | Roof et al. |
| 2018/0005126 A1* | 1/2018 | Yamagami ............. G06N 20/00 |
| 2018/0005293 A1* | 1/2018 | Adams .............. G06F 16/90335 |
| 2018/0052913 A1 | 2/2018 | Gaskill et al. |
| 2018/0330206 A1 | 11/2018 | Shyshkov et al. |
| 2019/0065625 A1* | 2/2019 | Shinn .................. G06F 16/9024 |
| 2019/0317938 A1 | 10/2019 | Agarwalla et al. |

FOREIGN PATENT DOCUMENTS

| | | |
|---|---|---|
| KR | 10-1828328 | 3/2018 |
| WO | 2016/196320 | 12/2016 |
| WO | 2017/170459 | 10/2017 |

OTHER PUBLICATIONS

Extended European Search Report and Written Opinion dated May 29, 2020 in corresponding European Patent Application No. 20152977.3.

European Office Action dated Jun. 24, 2021 for EP Application No. 20152977.3.

* cited by examiner

FIG. 5

| act_030.to30_tcso_prty_anl | | | ~510 |
|---|---|---|---|
| user_id | anl dvce lst reg nm | cnty_cd | |
| 00305zyoqv | Galaxy S8 | KOR | |
| 00ar0j0r05 | Galaxy S8 Plus | KOR | |
| qoijefoiqe | Galaxy Note S8 | KOR | |
| wjfkdnf123 | Galaxy S9 | KOR | |
| 01djfiwo3k | Galaxy S9 Plus | KOR | |

520

| acm_601.to601_ztcdb0040 | acm_601.to601_ztcdb0231 | | | |
|---|---|---|---|---|
| zzsaquid | cust_no | model | prod_name | sell date |
| 00305zyoqv | 10001245764518 | UN32EH4003F | CVT:LED TV:HD:32 | 20130309 |
| 00ar0j0r05 | 10001245764512 | UN32M4020AFXKR | CVT:LED TV:HD:32 | 20130609 |
| qoijefoiqe | 10001342754615 | UN32K4100BFXKR | CVT:LED TV:HD:32 | 20141213 |
| stoijf6er3 | 11006457142137 | UN32M4000AFXKR | CVT:LED TV:HD:32 | 20150405 |
| eidksljk41 | 10017649184572 | UN32H4030AF | CVT:LED TV:HD:32 | 20160207 |

530

| rbn_795.to795_rs_devices | | rbn_795.log_app_usage_hist | |
|---|---|---|---|
| samsung_account_id | rubin_id | app_id | crt_dd |
| 00305zyoqv | 002a64f3-3d81-43d4-8359-f3fc50075cfa | com.google.android.youtube | 2017-10-26 |
| 00ar0j0r05 | 00006910-3f37-4007-9c8b-a2ee8ea74599 | com.google.android.apps.youtube.creater | 2017-11-23 |
| qoijefoiqe | 00134cc5-81b1-4db8-9433-3103d297d67c | com.google.android.apps.youtube.gaming | 2017-12-22 |
| wjfkdnf123 | 0009c527-5c48-4503-bf64-e60c36aebee4 | com.google.android.apps.youtube.vr | 2018-02-21 |
| 01djfiwo3k | 0017a3d5-73df-495d-bc46-7f28dc8f75a7 | com.google.android.apps.youtube.music | 2018-04-20 |

ELECTRONIC DEVICE AND METHOD FOR CONTROLLING THE ELECTRONIC DEVICE

CROSS-REFERENCE TO RELATED APPLICATION

This application is based on and claims priority under 35 U.S.C. § 119 to Korean Patent Application No. 10-2019-0009833, filed on Jan. 25, 2019, in the Korean Intellectual Property Office, the disclosure of which is incorporated by reference herein in its entirety.

BACKGROUND

1. Field

The disclosure relates to an electronic device and a method for controlling the electronic device, and for example, to an electronic device which is capable of acquiring response data for a user inquiry from a plurality of databases and providing a response for the user inquiry and a method for controlling the electronic device.

2. Description of Related Art

Recently, artificial intelligence systems are being used in various fields. An artificial intelligence system is a system wherein a machine learns, determines, and becomes smarter by itself, unlike conventional rule-based smart systems. An artificial intelligence system shows a more improved recognition rate as it is used more, and becomes capable of understanding user preference more correctly. For this reason, conventional rule-based smart systems are gradually being replaced by deep learning-based artificial intelligence systems.

An artificial intelligence technology may include machine learning (for example, deep learning) and element technologies utilizing machine learning.

Machine learning may refer, for example, to an algorithm technology of classifying/learning the characteristics of input data by itself, and an element technology may refer, for example, to a technology of simulating functions of a human brain such as cognition and determination using a machine learning algorithm such as deep learning, and may include, for example, fields of technologies such as linguistic understanding, visual understanding, inference/prediction, knowledge representation, and operation control. In particular, language understanding may refer, for example, to a technology of recognizing and applying/processing human languages/characters, and includes natural language processing, machine translation, conversation systems, inquiries and responses, voice recognition/synthesis, etc.

Recently, conversation type services providing responses to user inquiries are being provided. Such conversation type services receive response data from a database storing data that can provide responses to user inquiries and provide responses.

In the past, various databases for providing responses to user inquiries existed. Such databases are different from one another in their methods of storing and managing data. Accordingly, limitations existed, which include, for providing a response for a user inquiry through a plurality of databases, a separate database integrating a plurality of databases had to be generated, or methods of storing and managing the data of a plurality of databases had to be integrated, or regulations for forms of user inquiries had to be made.

Additionally, for an electronic device to perform an operation for a user voice, the developer should describe in advance an intent and a parameter (or, a slot, an entity) mapped to a user voice command. That is, preliminary definition for a sample inquiry is needed. However, such a method has a problem that it is difficult to control devices of various manufacturers, and also, it is difficult to systematically interlock with a new data type.

SUMMARY

Embodiments of the disclosure provide an electronic device that is capable of generating a plurality of inquiries for acquiring response data for a user inquiry from a plurality of databases using a relation graph indicating a relation of data stored in a plurality of databases, and a method for controlling the electronic device.

Embodiments of the disclosure also provide a method of managing databases stored in different types of devices or applications with a relation graph, and generating a sample inquiry and a sample response for processing a voice command based on a relation graph.

An electronic device according to an example embodiment of the disclosure includes a microphone, a memory including at least one instruction, and a processor executing the at least one instruction. The processor may, based on receiving input of a user inquiry through the microphone, control the electronic device to perform voice recognition for the user inquiry and acquire a text for the user inquiry, generate a plurality of inquiries for acquiring response data for the user inquiry from a plurality of databases using a relation graph indicating a relation between the acquired text and data stored in the plurality of databases, acquire response data corresponding to each of the plurality of inquiries from each of the plurality of databases, and generate a response for the user inquiry based on the response data acquired from each of the plurality of databases and output the response.

A method for controlling an electronic device according to an example embodiment of the disclosure includes performing voice recognition for a user inquiry and acquiring a text for the user inquiry based on receiving input of a user inquiry through the microphone, generating a plurality of inquiries for acquiring response data for the user inquiry from a plurality of databases using a relation graph indicating a relation between the acquired text and data stored in the plurality of databases, acquiring response data corresponding to each of the plurality of inquiries from each of the plurality of databases, and generating a response for the user inquiry based on the response data acquired from each of the plurality of databases and outputting the response.

As described above, by providing a response for a user inquiry using a relation graph indicating a relation among data stored in a plurality of databases, a more precise response can be provided without a separate integrating process of databases. Also, an electronic device can provide a more precise response for an inquiry through systematic connection among different types of databases.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5 is a diagram illustrating data example fields of a plurality of databases and data included in data fields according to an embodiment of the disclosure;

DETAILED DESCRIPTION

Figure 1:
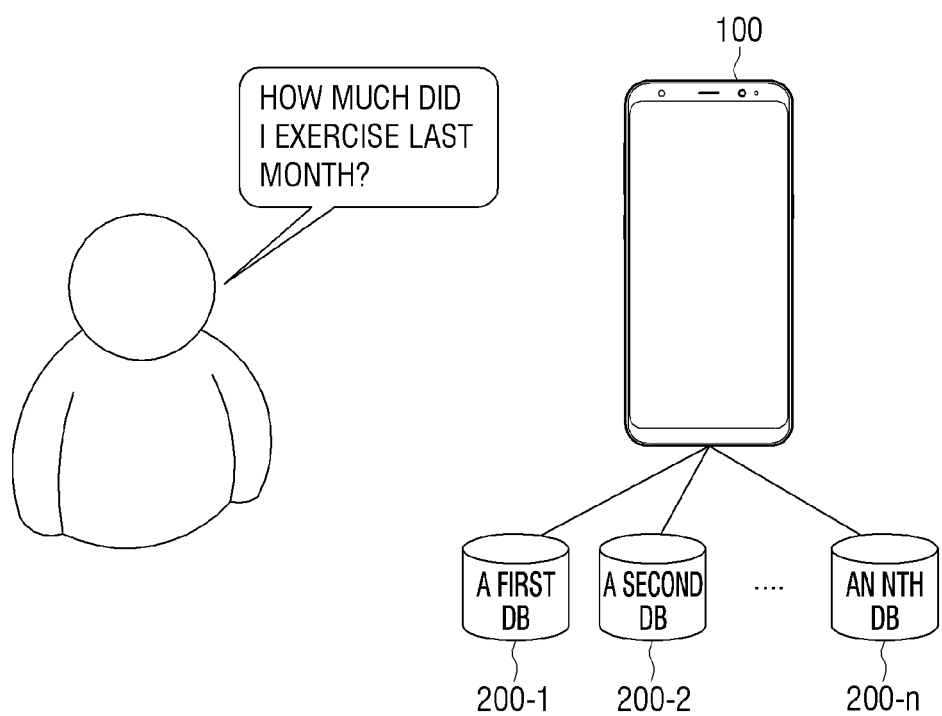
FIG. 1 is a diagram illustrating an example system that provides a response for a user inquiry according to an embodiment of the disclosure.

Hereinafter, various example embodiments of the disclosure will be described in greater detail with reference to the accompanying drawings. It should be understood that the various example embodiments are not for limiting the technology described in the disclosure to a specific embodiment, but should be interpreted to include various modifications, equivalents and/or alternatives of the embodiments of the disclosure. Also, with respect to the descriptions of drawings, similar reference numerals may be used for similar components.

In the disclosure, expressions such as "have," "may have," "include" and "may include" should be understood as denoting that there are such characteristics (e.g., elements such as numerical values, functions, operations and components), and the expressions are not intended to exclude the existence of additional characteristics.

In the disclosure, the expressions "A or B," "at least one of A and/or B," or "one or more of A and/or B" and the like may include all possible combinations of the listed items. For example, "A or B," "at least one of A and B," or "at least one of A or B" refer to all of the following cases: (1) including at least one A, (2) including at least one B, or (3) including at least one A and at least one B.

Further, the expressions "first," "second" and the like used in the disclosure may be used to describe various elements regardless of any order and/or degree of importance. Also, such expressions are used to distinguish one element from another element, and are not intended to limit the elements.

In addition, in the disclosure where one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). Where the description includes one element (e.g., a first element) being "directly coupled" or "directly connected" to another element (e.g., a second element) it may be understood that still another element (e.g., a third element) does not exist between the one element and the another element.

The expression "configured to" used in the disclosure may be interchangeably used with other expressions such as "suitable for," "having the capacity to," "designed to," "adapted to," "made to" and "capable of," depending on cases. The term "configured to" does not necessarily refer to a situation in which a device is "specifically designed to" in terms of hardware. Instead, under some circumstances, the expression "a device configured to" may refer, for example, to the device being "capable of" performing an operation together with another device or component. For example, the phrase "a sub-processor configured to perform A, B and C" may refer, for example, and without limitation, to a dedicated processor (e.g., an embedded processor) for performing the corresponding operations, a generic-purpose processor (e.g., a CPU or an application processor), or the like, that can perform the corresponding operations by executing one or more software programs stored in a memory device.

An electronic device according to various embodiments of the disclosure may include, for example, and without limitation, at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical instrument, a camera, a wearable device, or the like. A wearable device may include, for example, and without limitation, at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), an implantable circuit, or the like. In some embodiments, an electronic device may include, for example, and without limitation, at least one of a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, an electronic photo frame, or the like.

In the disclosure, the term "user" may refer, for example, to a person who uses an electronic device or a device using an electronic device (e.g., an artificial intelligence electronic device).

Hereinafter, the disclosure will be described in greater detail with reference to the accompanying drawings.

FIG. 1 is a diagram illustrating an example system that provides a response for a user inquiry according to an embodiment of the disclosure. As illustrated in FIG. 1, a system may include an electronic device 100 and first to nth databases 200-1, 200-2, . . . , 200-n. Meanwhile, the plurality of databases 200-1, 200-2, . . . , 200-n described in FIG. 1 are devices storing data, and may be implemented as at least one device outside the electronic device 100. However, this is merely an example, and databases may be included inside the electronic device 100. In an example, in which databases are provided inside the electronic device 100, the databases may, for example, be divided according to programs or applications. For example, an area storing data for a first application may be referred to as a first database, and an area storing data for a second application may be referred to as a second database, etc.

For example, the electronic device 100 may generate a relation graph indicating or representing a relation among data stored in the plurality of databases 200-1, 200-2, . . . , 200-n and store the graph before receiving a user inquiry. For example, the relation graph may be a graph expressing a relation among data as a connective relation among a plurality of nodes.

For example, the electronic device 100 may analyze data fields stored in the plurality of databases 200-1, 200-2, . . . , 200-n and acquire a relation graph indicating a relation among data stored in the plurality of databases. For example, the electronic device 100 may analyze at least one of the names of data fields included in the plurality of databases 200-1, 200-2, . . . , 200-n, the names of data included in the data fields, or distribution of data and determine similar data fields among the plurality of databases 200-1, 200-2, . . . , 200-n. The electronic device 100 may, for example, determine upper concepts of the determined similar data fields, and designate the upper concepts as upper nodes, and designate the similar data fields as lower nodes of the upper nodes and acquire a relation graph. For example, the electronic device 100 may designate "a user," "a period," "the types of exercise," and "the amount of exercise" as upper nodes for a plurality of databases related to health, and designate lower nodes corresponding to each upper node and generate a relation graph for the plurality of databases related to health. However, it will be understood that the disclosure is not limited thereto.

The electronic device 100 may generate a sample inquiry and a sample response based on a relation graph. For example, the electronic device 100 may determine elements of a sample inquiry and a sample response based on upper nodes of a relation graph, and include a sample inquiry and a sample response based on the determined elements. For example, the electronic device 100 may generate a sample inquiry including at least one inquiry element among "a user," "a period," "the types of exercise," and "the amount of exercise" as a sample inquiry related to health, and generate a sample response including information on at least one response element among "a user," "a period," "the types of exercise," and "the amount of exercise." However, it will be understood that this is merely an example, and that the disclosure is not limited thereto. The electronic device 100 may store information on the relation graph, the sample inquiry, and the sample response.

The electronic device 100 may receive an input (e.g., an input of a user) inquiry through a microphone. The electronic device 100 may receive input of a user inquiry through a microphone that exists inside the electronic device 100, but this is merely an example, and the electronic device 100 may receive input of a user inquiry through a microphone electronically connected with the electronic device 100. Meanwhile, in the aforementioned embodiment, it was described that the electronic device 100 receives input of a user inquiry through a microphone. However, this is merely an example, and the electronic device 100 may receive input of a user inquiry by various methods (e.g., a user touch input, etc.). As an example, the electronic device 100 may receive input of a user inquiry which is "How much did I exercise last month?"

The electronic device 100 may perform voice recognition for a user inquiry input through a microphone and acquire a text for the user inquiry. For example, the electronic device 100 may perform voice recognition using an automatic speech recognition (ASR) module (e.g., including processing circuitry and/or executable program elements). The electronic device 100 may perform voice recognition using an ASR module provided inside the electronic device 100, but this is merely an example, and the electronic device 100 may perform voice recognition through an external server connected with the electronic device 100. For example, the electronic device 100 may transmit a user inquiry to an external server, and the external server may perform voice recognition for the user inquiry and acquire a text for the user inquiry, and transmit the acquired text to the electronic device 100.

The electronic device 100 may determine an intent and a parameter (or, a slot, an entity) for a user inquiry based on the acquired text. For example, the electronic device 100 may acquire an intent and a parameter for a user inquiry using a natural language understanding module (e.g., including processing circuitry and/or executable program elements).

The electronic device 100 may generate a plurality of queries for acquiring response data for a user inquiry from a plurality of databases 200-1, 200-2, . . . , 200-n using a relation graph indicating a relation between the acquired text and data stored in the plurality of databases 200-1, 200-2, . . . , 200-n. For example, the electronic device 100 may determine whether the acquired text corresponds to a sample inquiry. For example, the electronic device 100 may determine whether a parameter included in the acquired text includes a parameter included in the sample inquiry and determine whether the acquired text corresponds to the sample inquiry. Where it is determined that the acquired text corresponds to the sample inquiry, the electronic device 100 may generate a plurality of queries using the acquired text and the relation graph. For example, the electronic device 100 may determine an upper node corresponding to the parameter included in the acquired text and a lower node included in an upper node corresponding to each of the plurality of databases 200-1, 200-2, . . . , 200-n, and generate a query for each of the plurality of databases 200-1, 200-2, . . . , 200-n. For example, the electronic device 100 may generate a first query corresponding to a first database 200-1, and generate a second query corresponding to a second database 200-2. In this manner, the electronic device 100 may generate an nth query corresponding to an nth database 200-n.

The electronic device 100 may transmit each of the plurality of generated queries to the plurality of corresponding databases 200-1, 200-2, . . . , 200-n. Each of the plurality of databases 200-1, 200-2, . . . , 200-n may respond to a query and acquire response data for the user inquiry, and transmit the acquired response data to the electronic device 100.

The electronic device 100 may generate a response for the user inquiry based on the acquired response data. For example, the electronic device 100 may generate a response for the user inquiry based on a stored sample response. For example, a sample response may be a form of integrating response data received from the plurality of databases 200-1, 200-2, . . . , 200-n. For example, and without limitation, a sample response for databases related to health may provide the sum of the amounts of exercise received from the plurality of databases 200-1, 200-2, . . . , 200-n. The electronic device 100 may provide the acquired response in the form of a natural language through a natural language generation (NLG) module (e.g., including processing circuitry and/or executable program elements). For example, the electronic device 100 may generate a response that "The sum of the amounts of exercise that Mr. OOO did last month is thirty five thousand calories," and output the response. As another example, the electronic device 100 may generate a response based on response data corresponding to each of the plurality of databases and output the response. For example, the electronic device 100 may generate a response that "Mr. OOO exercised in the amount of ten thousand calories using the A application, exercised in the amount of twenty thousand calories using the B application, and exercised in the amount of five thousand calories using the C application, and the sum of the amounts of exercise that Mr. OOO did last month is thirty five thousand calories," and output the response.

As described above, the electronic device 100 may use an artificial intelligence agent to provide a response for a user inquiry using the plurality of databases 200-1, 200-2, . . . , 200-n. For example, an artificial intelligence agent may refer, for example, to a dedicated program for providing artificial intelligence (AI) based services (e.g., a voice recognition service, an agent service, a translation service, a search service, etc.), and may, for example, and without limitation, be executed by a conventional general-purpose processor (e.g., a CPU), a separate AI-dedicated processor (e.g., a GPU, etc.), or the like. For example, an artificial intelligence agent may control various modules (e.g., a conversation system) that will be described in greater detail below.

For example, in case a predetermined user voice (e.g., "Bixby," etc.) is input or a button (e.g., a button for executing an artificial intelligence agent) provided on the electronic device 100 is pushed, the artificial intelligence agent may operate. An artificial intelligence agent may provide a response to an input user inquiry. An artificial intelligence agent may control various devices or modules that will be described below. Detailed explanation in this regard will be made later.

Figure 2:
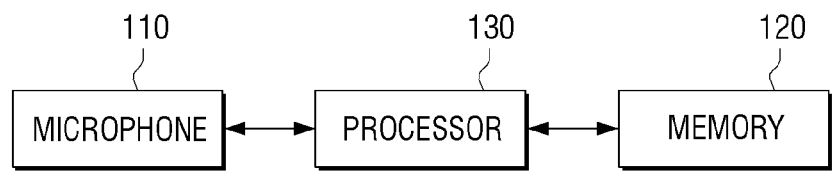
FIG. 2 is a block diagram illustrating an example configuration of an electronic device according to an embodiment of the disclosure.

FIG. 2 is a block diagram illustrating an example configuration of an electronic device according to an embodiment of the disclosure. As illustrated in FIG. 2, the electronic device 100 may include a microphone 110, a memory 120, and a processor (e.g., including processing circuitry) 130. However, the components of the electronic device 100 are not limited to the aforementioned components, and some components can be added or omitted according to the type of the electronic device.

The microphone 110 may receive an input, for example, of a user voice. The microphone 110 may receive a trigger voice (or a wake-up voice) indicating initiation of voice recognition, and may receive a user inquiry requesting specific information. In particular, the microphone 110 may be provided inside the electronic device 100, or it may be provided outside and electronically connected with the electronic device 100.

The memory 120 may store instructions or data related to at least one other component of the electronic device 100. For example, and without limitation, the memory 120 may be implemented as a non-volatile memory, a volatile memory, a flash-memory, a hard disk drive (HDD), or a solid state drive (SDD), etc. The memory 120 may be accessed by the processor 130, and reading/recording/correction/deletion/update, etc. of data by the processor 130 may be performed. In the disclosure, the term memory may include the memory 120, a ROM (not shown) inside the processor 130, a RAM (not shown), or a memory card (not shown) (e.g., a micro SD card, a memory stick) mounted on the electronic device 100. In the memory 120, programs and data, etc. for constituting various screens to be displayed in the display area of the display may be stored.

The memory 120 may store an artificial intelligence agent for operating a conversation system providing a response for a user inquiry. For example, the electronic device 100 may use an artificial intelligence agent for providing a response for a user inquiry using a plurality of databases. An artificial intelligence agent may refer, for example to a dedicated program for providing artificial intelligence (AI) based services (e.g., a voice recognition service, an agent service, a translation service, a search service, etc.). For example, and without limitation, an artificial intelligence agent may be executed by a conventional general-purpose processor (e.g., a CPU), a separate AI-dedicated processor (e.g., a GPU, an NPU, etc.), or the like.

Figure 4A:
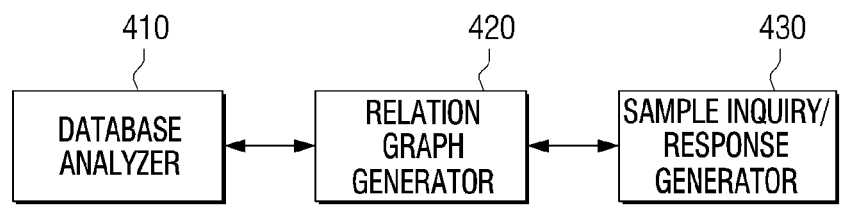
FIG. 4A is a block diagram illustrating an example configuration of an electronic device for generating a knowledge graph and a sample inquiry/response according to an embodiment of the disclosure.
Figure 4B:
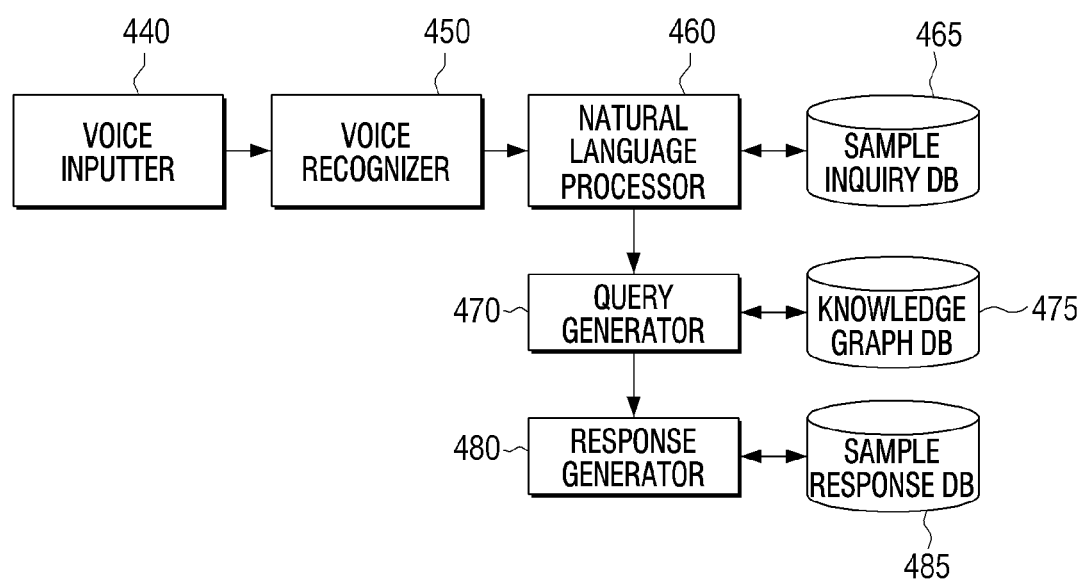
FIG. 4B is a block diagram illustrating an example configuration of an electronic device for providing a response for a user inquiry using a knowledge graph according to an embodiment of the disclosure.
Figure 6:
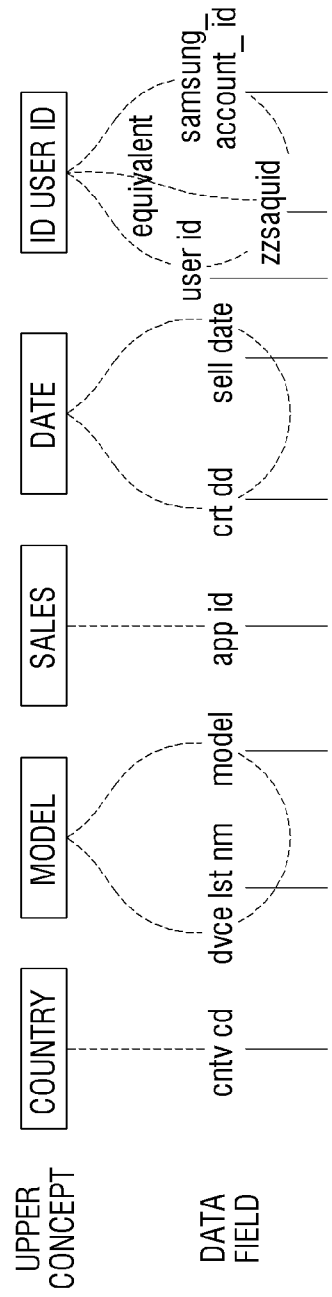
FIG. 6 is a diagram illustrating an example method of extracting a plurality of nodes based on data fields of a plurality of databases according to an embodiment of the disclosure.

The memory 120 may store components for the electronic device 100 to generate a relation graph and a sample inquiry/a sample response as illustrated in FIG. 4A, and components for the electronic device 100 to provide a response for a user inquiry, as illustrated in FIG. 4B. Detailed explanation in this regard will be made below with reference to FIGS. 4A and 4B.

The memory 120 may store a relation graph indicating a relation among data stored in a plurality of databases and a sample inquiry and a sample response generated through the relation graph.

The processor 130 may include various processing circuitry and be electronically connected with the memory 120 and control the overall operations and functions of the electronic device 100. For example, when a user inquiry is input through the microphone 110, the processor 130 may perform voice recognition for the user inquiry and acquire a text for the user inquiry, and generate a plurality of queries for acquiring response data for the user inquiry from a plurality of databases using the acquired text and a relation graph indicating a relation among data stored in the plurality of databases, and acquire response data corresponding to each of the plurality of queries from each of the plurality of databases, and generate a response for the user inquiry based on response data acquired from each of the plurality of databases, and output the response.

For example, the processor 130 may analyze a plurality of databases and generate a relation graph indicating a relation among data stored in the plurality of databases, and store the graph in the memory 120. For example, the processor 130 may analyze data fields stored in a plurality of databases and acquire a relation graph indicating a relation among data stored in the plurality of databases. For example, the processor 130 may analyze at least one of the names of data fields included in the plurality of databases, the names of data included in the data fields, or distribution of data and determine similar data fields among the plurality of databases, and determine upper concepts of the determined similar data fields, and designate the upper concepts as upper nodes, and designate the similar data fields as lower nodes of the upper nodes and acquire a relation graph.

The processor 130 may generate a sample inquiry and a sample response based on upper nodes included in the relation graph and store the sample inquiry and the sample response in the memory 120. For example, the processor 130 may acquire a sample inquiry and a sample response based on upper nodes acquired based on upper concepts of data fields included in the plurality of databases and store the sample inquiry and the sample response.

The processor 130 may receive input of a user inquiry through the microphone 120. For example, the processor 130 may determine whether the acquired text corresponds to the sample inquiry stored in the memory 120. In case it is determined that the acquired text corresponds to the sample inquiry, the processor 130 may generate a plurality of queries using the acquired text and the relation graph stored in the memory 120. For example, the processor 130 may determine upper nodes corresponding to each of a plurality of inquiry elements included in the text corresponding to the user inquiry, and generate a plurality of queries based on a plurality of lower nodes included in the upper nodes. For example, the processor 130 may acquire a plurality of first keywords corresponding to each of the plurality of inquiry elements based on a lower node corresponding to a first database included in the upper node, and generate a first query for the first database based on the plurality of first keywords, and acquire a plurality of second keywords corresponding to each of the plurality of inquiry elements based on a lower node corresponding to a second database included in the upper node, and generate a second query for the second database based on the plurality of second keywords.

The processor 130 may transmit corresponding queries to each of the plurality of databases, and acquire response data in response to the queries from the plurality of databases. When response data is acquired from each of the plurality of databases, the processor 130 may generate a response based on the sample response stored in the memory 120, and output the response. The processor 130 may not provide a plurality of response data separately, but may generate a response by integrating the response data and provide the response.

Figure 3:
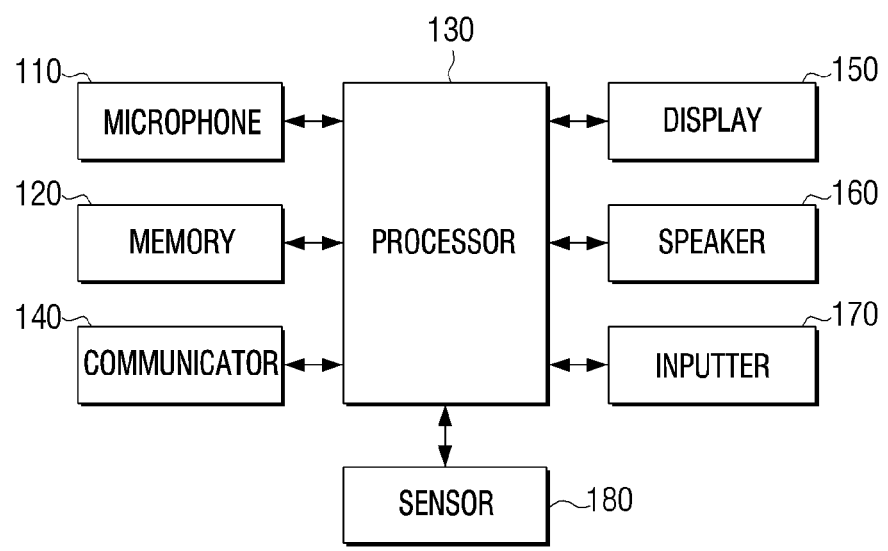
FIG. 3 is a block diagram illustrating an example configuration of an electronic device according to an embodiment of the disclosure.

FIG. 3 is a block diagram illustrating an example configuration of an electronic device according to an embodiment of the disclosure. As illustrated in FIG. 3, the electronic device 100 may include a microphone 110, a memory 120, a communicator (e.g., including communication circuitry) 140, a display 150, a speaker 160, an inputter (e.g., including input circuitry) 170, a sensor 180, and a processor (e.g., including processing circuitry) 130. As the microphone 110, the memory 120, and the processor 130 illustrated in FIG. 3 were explained in FIG. 2, overlapping explanation may not be repeated here.

The communicator 140 may include various communication circuitry and perform communication with an external device. For example, communicative connection of the communicator 140 with an external device may include communication through a third device (e.g., a repeater, a hub, an access point, a server, or a gateway, etc.), but the disclosure is not limited thereto.

The communicator 140 may include various communication modules including various communication circuitry for performing communication with an external device. For example, the communicator 140 may include various modules including various communication circuitry, such as, for example, and without limitation, a wireless communication module, a cellular communication module using, for example, at least one of LTE, LTE Advance (LTE-A), code division multiple access (CDMA), wideband CDMA (WCDMA), a universal mobile telecommunications system (UMTS), Wireless Broadband (WiBro), a Global System for Mobile Communications (GSM), or the like. As another example, a wireless communication module may include, for example, at least one of wireless fidelity (WiFi), Bluetooth, Bluetooth low energy (BLE), Zigbee, near field communication (NFC), Magnetic Secure Transmission, radio frequency (RF), a body area network (BAN), etc. The communicator 140 may include a wired communication module, and may include, for example, and without limitation, at least one of a universal serial bus (USB), a high definition multimedia interface (HDMI), recommended standard232 (RS-232), power line communication, or a plain old telephone service (POTS). Networks wherein wireless communication or wired communication is performed may include at least one of a telecommunication network, for example, a computer network (e.g., an LAN or a WAN), Internet, or a telephone network.

The communicator 140 may transmit a query for acquiring response data to a plurality of databases, and receive response data in response to the query from the plurality of databases. The communicator 140 may transmit voice data corresponding to a user inquiry to an external server for voice recognition, and receive text data corresponding to the user inquiry which is a result of voice recognition.

The display 150 may display various information according to control of the processor 130. For example, the display 150 may display a message for providing a response for a user voice. The display 150 may be implemented as a touch screen together with a touch panel.

The speaker 160 is a component that outputs not only various kinds of audio data for which various processing operations such as, for example, and without limitation, decoding or amplification, and noise filtering, etc. were performed by an audio processor, but also various kinds of notification sounds or voice messages. For example, the speaker 160 may output a response for a user voice as a voice message in the form of a natural language. A component for outputting audio may be implemented as a speaker, but this is merely an example, and the component may be implemented as an output terminal that can output audio data.

The inputter 170 may include various input circuitry and receive a user input for controlling the electronic device 100. For example, the inputter 170 may include, for example, and without limitation, a touch panel for receiving input of a user touch using a user's hand, a stylus pen, etc., a button for receiving input of a user manipulation, etc. Other than the above, the inputter 170 may be implemented as various different input devices (e.g., a keyboard, a mouse, a motion inputter, etc.).

The sensor 180 may detect various status information of the electronic device 100. For example, the sensor 180 may include a motion sensor (e.g., a gyro sensor, an acceleration sensor, etc.) that can detect motion information of the electronic device 100, and also, a sensor that can detect location information (e.g., a Global Positioning System (GPS) sensor), a sensor that can detect environment information around the electronic device 100 (e.g., a temperature sensor, a humidity sensor, an air pressure sensor, etc.), a sensor that can detect user information of the electronic device 100 (e.g., a blood pressure sensor, a blood sugar sensor, a pulse rate sensor, etc.), a sensor that can detect presence of a user (e.g., a camera, a UWB sensor, an IR sensor, a proximity sensor, a light sensor, etc.), etc. Other than the above, the sensor 180 may further include an image sensor for photographing the outside of the electronic device 100, etc.

The processor 130 may include various processing circuitry, such as, for example, and without limitation, one or more of a central processing unit (CPU) processing digital signals, a micro controller unit (MCU), a micro processing unit (MPU), a controller, an application processor (AP), a communication processor (CP), an ARM processor, or the like, or may be defined by the terms. The processor 130 may be implemented as a system on chip (SoC) having a processing algorithm stored therein or large scale integration (LSI), or in the form of a field programmable gate array (FPGA). The processor 130 may perform various functions by executing computer executable instructions stored in the memory 120. In addition, the processor 130 may include at least one of a graphics-processing unit (GPU), a neural processing unit (NPU) (e.g., including various processing circuitry and/or executable program elements), a visual processing unit (VPU) (e.g., including various processing circuitry and/or executable program elements), or the like, which may include separate AI-dedicated processors, for performing an artificial intelligence function.

FIG. 4A is a block diagram illustrating an example configuration of an electronic device for generating a knowledge graph and a sample inquiry/a sample response according to an embodiment of the disclosure. As illustrated in FIG. 4A, the electronic device 100 includes a database analyzer (e.g., including various processing circuitry and/or executable program elements) 410, a relation graph generator (e.g., including various processing circuitry and/or executable program elements) 420, and a sample inquiry/response generator (e.g., including various processing circuitry and/or executable program elements) 430, for generating a knowledge graph and a sample inquiry/a sample response. A method for the electronic device 100 to generate a knowledge graph and a sample inquiry/a sample response will be described in greater detail below with reference to FIGS. 5, 6, 7, 8A and 8B.

The database analyzer 410 may include various processing circuitry and/or executable program elements and analyze a plurality of databases for providing response data to the electronic device 100. For example, the database analyzer 410 may analyze the data structures and data fields of databases for logically integrating a plurality of databases and generating a relation graph. For example, in case first to third databases 510, 520, 530 as illustrated in FIG. 5 exist, the database analyzer 410 may analyze the structures and data fields of the first to third databases 510, 520, 530. For example, the database analyzer 410 may analyze that the uppermost data field of the first database 510 includes "act_030.to30_tcso_prty_anl", and the upper data field includes "user_id", "anl dvce 1st reg nm", and "cnty_cd." The database analyzer 410 may analyze that the uppermost data field of the second database 520 includes "acm_601.to601_ztcdb0040" and "acm_601.to601_ztcdb0231", and the "acm_601.to601_ztcdb0040" data field includes "zzsaquid" which is an upper field and the "acm_601.to601_ztcdb0231" data field includes "cust_no", "model", "prod_name", and "sell date" which are upper fields. The database analyzer 410 may analyze that the uppermost data field of the third database 530 includes "rbn_795.to795_rs_devices" and "rbn_795.log_app_usage_hist", and the "rbn_795.to795_rs_devices" data field includes "samsung_account_id" and "rubin_id" which are upper fields, and the "rbn_795.log_app_usage_hist" data field includes "app_id" and "crt_dd" which are upper fields.

The relation graph generator 420 may include various processing circuitry and/or executable program elements and generate a relation graph indicating a relation among data stored in the plurality of databases based on the analysis result.

For example, the relation graph generator 420 may analyze data fields stored in the plurality of databases and acquire a relation graph indicating a relation among data stored in the plurality of databases. For example, the relation graph generator 420 may analyze at least one of the names of data fields included in the plurality of databases, the names of data included in the data fields, or distribution of data and determine similar data fields among the plurality of databases. For example, the relation graph generator 420 may determine that id is commonly included in the field names of the data field "user_id" of the first database 510, the data field "zzsaquid" of the second database 520, and the data field "samsung_account_id" of the third database 530 and determine that the names of data included in the data fields all coincide, and determine that the data field "user_id" of the first database 510, the data field "zzsaquid" of the second database 520, and the data field "samsung_account_id" of the third database 530 are similar data fields. As another example, the relation graph generator 420 may determine that data included in the data field "sell date" of the second database 520 and the data field "crt_dd" of the third database 530 has a structure indicating a date and determine that distribution of data is similar, and determine that the data field "sell date" of the second database 520 and the data field "crt_dd" of the third database 530 are similar data fields. As still another example, the relation graph generator 420 may determine that data included in the data field "anl dvce 1st reg nm" of the first database 510 and the data field "model" of the second database 520 is data regarding product models and determine that distribution of data is similar, and determine that the data field "anl dvce 1st reg nm" of the first database 510 and the data field "model" of the second database 520 are similar data fields.

The relation graph generator 420 may determine an upper concept of similar data fields determined based on data included in the data fields. For example, the relation graph generator 420 may analyze data included in the data field "user_id" of the first database 510, the data field "zzsaquid" of the second database 520, and the data field "samsung_account_id" of the third database 530 and determine that the upper concept of the three fields is "a user ID." As another example, the relation graph generator 420 may analyze data included in the data field "sell date" of the second database 520 and the data field "crt_dd" of the third database 530 and determine that the upper concept of the two fields is "a date." As still another example, the relation graph generator 420 may analyze data included in the data field "anl dvce 1st reg nm" of the first database 510 and the data field "model" of the second database 520 and determine that the upper concept of the two data fields is "a model." Other than the above examples, the relation graph generator 420 may analyze data included in the data field "cntv cd" included in the first database 510 and determine the upper concept of the data field "cntv cd" as "a country," and analyze data included in the data field "app_id" included in the third database 530 and determine the upper concept of the data field "app_id" as "sales." In other words, by the aforementioned method, the relation graph generator 420 may determine data fields included in a plurality of databases 510, 520, 530 and an upper concept, as illustrated, for example, in FIG. 6.

Figure 7:
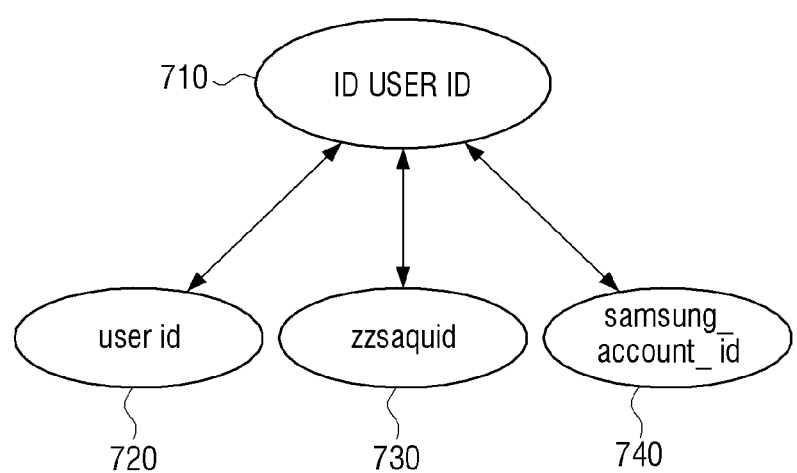
FIG. 7 is a diagram illustrating an example method of generating a knowledge graph based on an upper node and a lower node according to an embodiment of the disclosure.

The relation graph generator 420 may designate the determined upper concept as an upper node, and designate similar data fields as lower nodes of the upper node, and acquire a relation graph. For example, as illustrated in FIG. 7, the relation graph generator 420 may designate "a user ID" which is an upper concept as the upper node 710, and designate "user id" 720, "zzsaquid" 730, and "samsung_account_id" 740 which are data fields included in "a user ID" as lower nodes included in the upper node and generate a relation graph.

The relation graph generator 420 may expand the generated relation graph as described above using a conventional knowledge graph storing general knowledge.

Figure 8A:
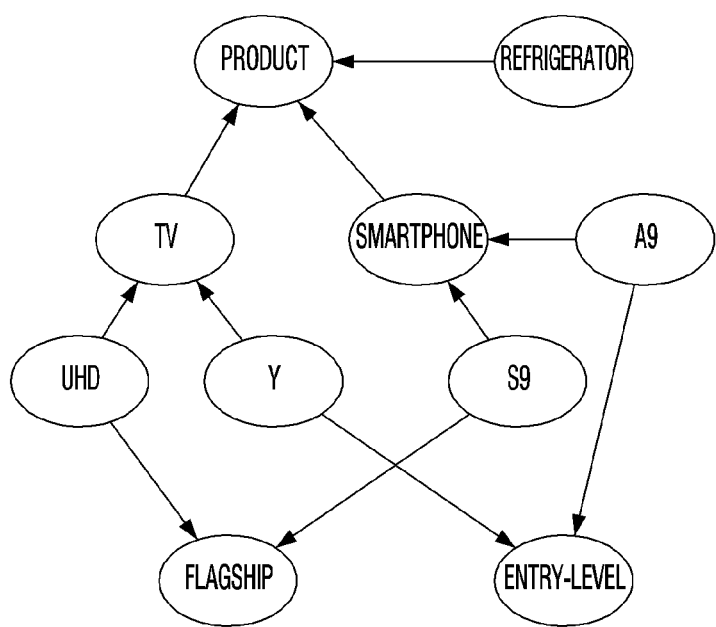
FIG. 8A is a diagram illustrating an example knowledge graph for a product upper node according to an embodiment of the disclosure.

For example, when generating a relation graph for a product upper node of which upper concept corresponds to "a product," as illustrated in FIG. 8A, the relation graph generator 420 may determine, for example, that a "UHD" node and an "S9" node are related as "flagship products" and a "Y" node and an "A9" node are related as "entry-level products" using a conventional knowledge graph, and generate a "flagship" node as the upper node of the "UHD" node and the "S9" node and generate an "entry-level" node as the upper node of the "Y" node and the "A9" node and expand the relation graph.

Figure 8B:
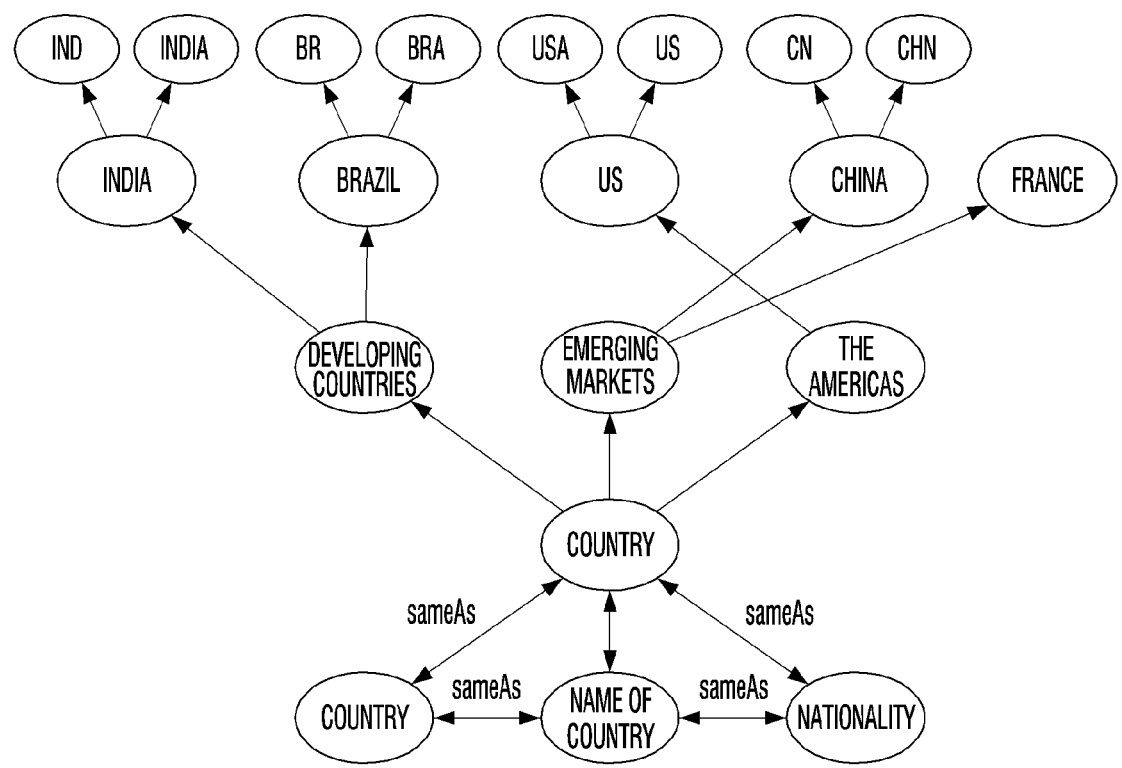
FIG. 8B is a diagram illustrating an example knowledge graph for a country upper node according to an embodiment of the disclosure.

As another example, when generating a relation graph for a country upper node of which upper concept corresponds to "a country," as illustrated in FIG. 8B, the relation graph generator 420 may determine that the "India" node and the "Brazil" node are related as "developing countries" and the "China" node and the "France" node are related as "emerging markets" using a conventional knowledge graph, and generate a "developing countries" node as the upper node of the "India" node and the "Brazil" node and generate an "emerging markets" node as the upper node of the "China" node and the "France" node and expand the relation graph. In addition, the relation graph generator 420 may determine that "IND" and "INDIA" are identical to each other as the country codes of India using a conventional knowledge graph, and generate an "India" node as the upper node of the "IND" node and the "INDIA" node and expand the relation graph.

By the aforementioned method, the relation graph generator 420 may generate a relation graph for each upper concept or a relation graph for a plurality of associated upper concepts and store the graph in the memory 120.

The sample inquiry/response generator 430 may include various processing circuitry and/or executable program elements and generate a sample inquiry and a sample response based on upper nodes included in a relation graph. For example, the sample inquiry/response generator 430 may determine elements of a sample inquiry and a sample response based on upper nodes of a relation graph, and a sample inquiry and a sample response based on the determined elements. As an example, the sample inquiry/response generator 430 may generate a sample inquiry including at least one inquiry element among "a country," "a model," "sales," "a date," and "a user ID" which are upper nodes in a relation graph regarding databases illustrated in FIG. 5. For example, the sample inquiry/response generator 430 may generate a sample inquiry including inquiry elements which are "a country," "a period," and "a product," such as "Tell me about the sales of "a product" sold during "a period" in "a country"". As another example, the sample inquiry/response generator 430 may generate a sample response for a generated sample inquiry. That is, the sample inquiry/response generator 430 may generate a sample response including response elements which are "a country," "a period," and "a product," such as "In "a country," "a product" was sold as much as "the sales amount" sold during "a period"". Then, the sample inquiry/response generator 430 may store the generated sample inquiry and sample response in the memory 120.

FIG. 4B is a block diagram illustrating an example configuration of an electronic device for providing a response for a user inquiry using a knowledge graph according to an embodiment of the disclosure. For example, as illustrated in FIG. 4B, the electronic device 100 may include a voice inputter (e.g., including voice input circuitry) 440, a voice recognizer (e.g., including voice recognition circuitry) 450, a natural language processor (e.g., including various processing circuitry and/or executable program elements) 460, a query generator (e.g., including various processing circuitry and/or executable program elements) 470, and a response generator (e.g., including various processing circuitry and/or executable program elements) 480. A method for an electronic device to provide a response to a user inquiry using a knowledge graph will be explained in greater detail below with reference to FIG. 9.

The voice inputter 440 may include various voice input circuitry and receive input of a user inquiry in the form of audio. Here, the voice inputter 440 may be implemented as a microphone, but this is merely an example, and the voice inputter 440 may be implemented as a communicator including communication circuitry for receiving a user inquiry in the form of audio from an external device. For example, the voice inputter 440 may receive input of a user inquiry which is "Tell me about the sales amount of the flagship product sold in the emerging country last year" through a microphone.

Figure 9:
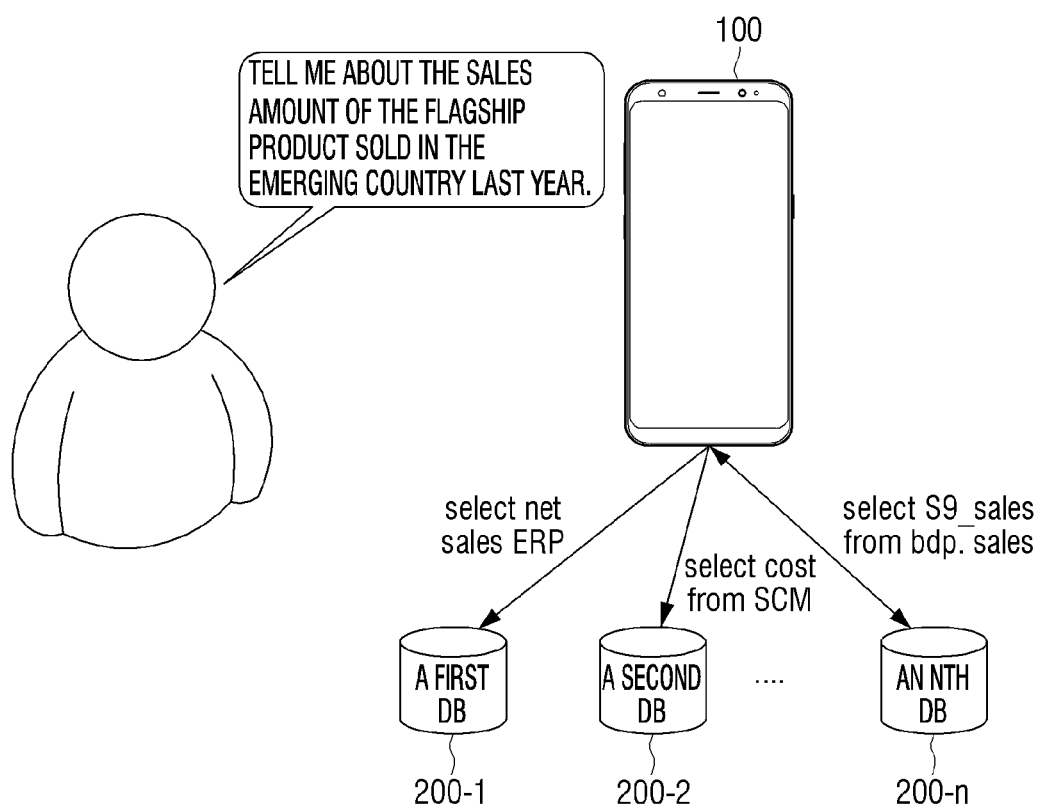
FIG. 9 is a diagram illustrating examples of a plurality of inquiries generated according to a user inquiry according to an embodiment of the disclosure.

The voice recognizer 450 may include various voice recognition circuitry and recognize a user voice. For example, the voice recognizer 450 may convert a user voice (e.g., a user inquiry) acquired by the electronic device 100 into text data using an automatic speech recognition (ASR) module. For example, the voice recognizer 450 may include an utterance recognition module (e.g., including various processing circuitry and/or executable program elements). The utterance recognition module may include an acoustic model and a language model. For example, an acoustic model may include information related to voicing, and a language model may include information on information on unit phonemes and combination of information on unit phonemes. An utterance recognition module may convert a user utterance into text data using information on information related to voicing and information on unit phonemes. Information on an acoustic model and a language model may be stored, for example, in an automatic speech recognition database (ASR DB). For example, as illustrated in FIG. 9, the voice recognizer 450 may acquire a user inquiry "Tell me about the sales amount of the flagship product sold in the emerging country last year" acquired through a microphone as text data.

The natural language processor 460 may include various processing circuitry and/or executable program elements and process the acquired text data in the form of a natural language and perform analysis of the meaning of the user voice. For example, the natural language processor 460 may acquire inquiry elements included in a user inquiry based on the acquired text. For example, the natural language processor 460 may include a natural language understanding (NLU) module (e.g., including various processing circuitry and/or executable program elements) that can perform syntactic analysis or semantic analysis for a user inquiry and figure out a user intent. In syntactic analysis, a user input may be divided in grammatical units (e.g., a word, a phrase, a morpheme, etc.), and it may be figured out which grammatical element a divided unit has. Semantic analysis may be performed using semantic matching, rule matching, formula matching, etc. Accordingly, a natural language understanding module may acquire a domain, an intent, or an element (or, a parameter, a slot) which is necessary for expressing an intent regarding a user input. In particular, the natural language processor 460 may acquire inquiry elements included in a user inquiry through a natural language understanding module. For example, in case the acquired text is "Tell me about the sales amount of the flagship product sold in the emerging country last year," the natural language processor 460 may determine the intent as "search of the sales amount," and determine the inquiry elements as "the emerging country, last year, the flagship product."

The natural language processor 460 may determine whether a user inquiry corresponds to a sample inquiry stored in a sample inquiry DB 465 storing at least one sample inquiry based on the acquired inquiry elements. For example, the natural language processor 460 may determine whether there is a sample inquiry including the acquired inquiry elements. For example, in case the inquiry elements are "the emerging country, last year, the flagship product," the natural language processor 460 may determine whether there is a sample inquiry including "a country," "a period," and "a product" based on the inquiry elements.

The query generator 470 may include various processing circuitry and/or executable program elements and generate queries to be transmitted to a plurality of databases based on inquiry elements processed through the natural language processor 460. For example, if a user inquiry corresponds to a sample inquiry stored in the sample DB 465, the query generator 470 may generate a plurality of queries for acquiring response data for the user inquiry from a plurality of databases using the acquired text (e.g., inquiry elements) and a relation graph stored in a knowledge graph DB 475.

For example, the query generator 470 may generate a plurality of queries corresponding to each of a plurality of databases using a relation graph. For example, as illustrated in FIG. 9, the query generator 470 may generate "select net sales ERP" as a query corresponding to the first database 200-1, and generate "select cost from SCM" as a query corresponding to the second database 200-2, and generate "select S9_sales from bdp.sales" as a query corresponding to the third database 200-n. For example, the query generator 470 may generate a query corresponding to each database based on data fields of databases included in a relation graph. Also, the query generator 470 may transmit the acquired query to a corresponding database.

The response generator 480 may include various processing circuitry and/or executable program elements and generate a response to a user inquiry by acquiring response data in response to queries from a plurality of databases. For example, response data may include response elements corresponding to inquiry elements.

For example, the response generator 480 may generate a response for a user inquiry based on a sample response stored in a sample response DB 485. For example, the generated response may be provided in the form of integrating response data. For example, the response generator 480 may generate a response that "The total sales amount of the flagship product sold in the emerging country is XXXX." The response generator 480 may provide a response by integrating all sales amounts received from a plurality of databases. For example, the response generator 480 may include a natural language generator (NLG) for providing a response in the form of a natural language utterance.

Other than the above, although not illustrated in FIG. 4B, the electronic device 100 may further include a dialogue manger (DM) module (e.g., including various processing circuitry and/or executable program elements) determining whether an intent included in a user inquiry is clear, a text to speech (TTS) module (e.g., including various processing circuitry and/or executable program elements) for converting a response to a voice form, etc.

Although it was described that all components in FIG. 4B are included in the electronic device 100, this is merely an example, and at least some components in FIG. 4B (e.g., the voice recognizer 450) may be included in an external server.

The components illustrated in FIGS. 4A and 4B may be implemented as a software module and stored in the memory 120, or manufactured in the form of at least one hardware chip and mounted on the electronic device 100. However, the disclosure is not limited thereto.

Although it was described that all of the components illustrated in FIG. 4A and the components illustrated in FIG. 4B are included in one electronic device 100, this is merely an example, and the components illustrated in FIG. 4A may be included in a first electronic device (e.g., a server), and the components illustrated in FIG. 4B may be included in a second electronic device (e.g., a user terminal, etc.). However, the disclosure is not limited thereto In FIG. 9, it was described that a plurality of databases exist outside the electronic device 100, but this is merely an example, and a plurality of databases may exist inside the electronic device 100, and some of a plurality of databases may exist inside the electronic device 100 and the others may exist outside the electronic device 100. However, the disclosure is not limited thereto.

Figure 10:
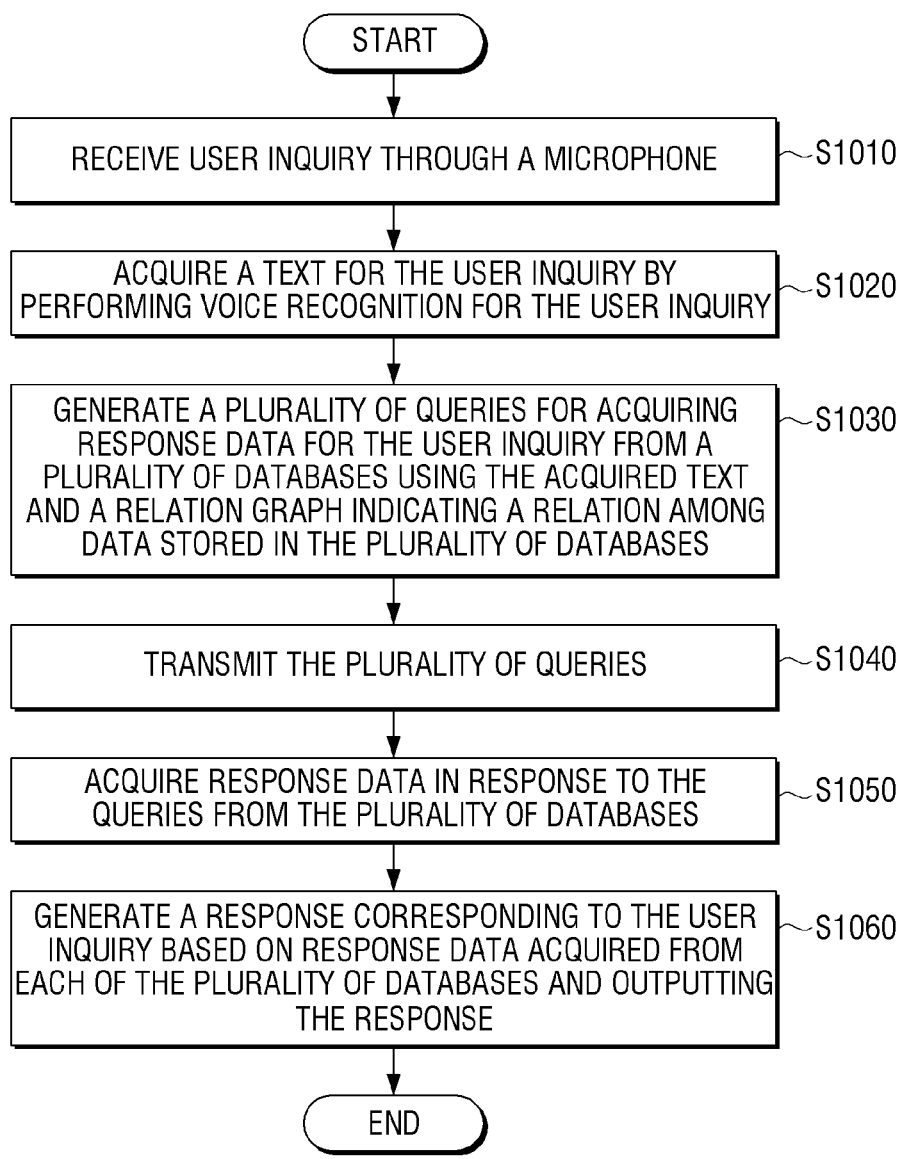
FIG. 10 is a flowchart illustrating an example method for controlling an electronic device according to an embodiment of the disclosure.

FIG. 10 is a flowchart illustrating an example method for controlling an electronic device according to an embodiment of the disclosure.

The electronic device 100 may receive input of a user inquiry through a microphone at operation S1010. For example, the electronic device 100 may receive input of a user inquiry from another electronic device other than a microphone. Also, the electronic device 100 may receive input of a user inquiry in the form of audio, but this is merely an example, and the electronic device 100 may receive input of a user inquiry in the form of a text. If a user inquiry in the form of a text is input, the operation S1020 may be omitted.

The electronic device 100 may perform voice recognition for a user inquiry and acquire a text for the user inquiry at operation S1020. For example, the electronic device 100 may acquire text data by performing voice recognition for a user inquiry using an ASR module. For example, the electronic device 100 may perform voice recognition for a user inquiry through an external server.

The electronic device 100 may generate a plurality of queries for acquiring response data for a user inquiry from a plurality of databases using the acquired text and a relation graph indicating a relation among data stored in a plurality of databases at operation S1030. For example, the electronic device 100 may generate a plurality of queries for a plurality of databases using a relation graph generated by the method as described in FIGS. 4A and 5 to 8B. Here, each of the plurality of generated queries may be generated based on a data field included in a corresponding database.

The electronic device 100 may transmit the plurality of queries to each of the corresponding databases at operation S1040, and the electronic device 100 may acquire response data in response to the queries from the plurality of databases at operation S1050.

The electronic device 100 may generate a response to the user inquiry based on response data acquired from each of the plurality of databases and output the response at operation S1060. The generated response may be a response which integrated the response data received from each of the plurality of databases.

Figure 11:
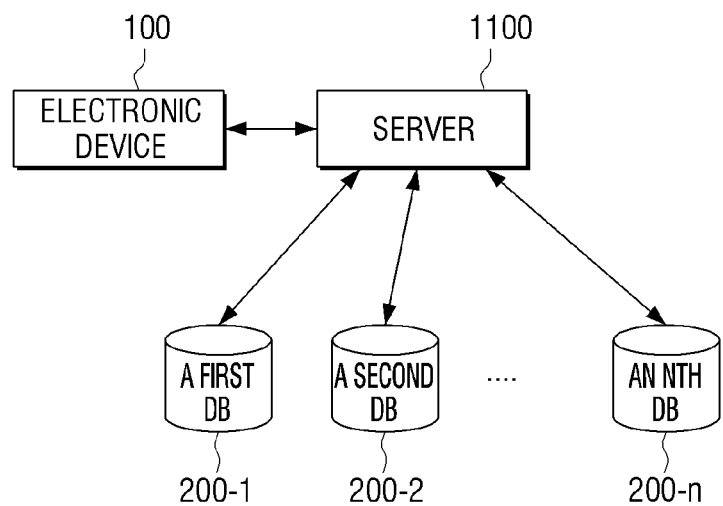
FIG. 11 is a diagram illustrating an example system provided with a response for a user inquiry using an external server according to another embodiment of the disclosure.

In the aforementioned embodiment, it was described that the electronic device 100 receives input of a user inquiry and provides a response, but this is merely an example, and the electronic device 100 may provide a response for a user inquiry using an external server. For example, as illustrated in FIG. 11, the electronic device 100 may receive input of a user inquiry, and transmit the input user inquiry to a server 1100. The server 1100 may store a relation graph, a sample inquiry, and a sample response by the method as described, for example, in FIGS. 4A and 5, 6, 7, 8A and 8B. The server 1100 may generate a plurality of queries corresponding to the plurality of databases 200-1, 200-2, ..., 200-n using a relation graph, and transmit each of the plurality of queries to the plurality of databases 200-1, 200-2, ..., 200-n. The server 1100 may generate a response for the user inquiry by acquiring response data in response to the queries from the plurality of databases 200-1, 200-2, ..., 200-n. The server 1100 may output the generated response to the electronic device 100, and the electronic device 100 may output a response for the received user inquiry.

The term "a part" or "a module" used in the disclosure includes a unit of hardware, software, or firmware, or any combination thereof, and it may be interchangeably used with terms, for example, logic, a logical block, a component, or a circuit. Also, "a part" or "a module" may be a component of an integrated body or a minimum unit performing one or more functions or a portion thereof. For example, a module may include an application-specific integrated circuit (ASIC).

The various embodiments of the disclosure may be implemented as software including instructions stored in machine-readable storage media, which can be read by machines (e.g., computers). The machines refer to devices that call instructions stored in a storage medium, and can operate according to the called instructions, and the devices may include an electronic device according to the aforementioned embodiments (e.g., an electronic device 100). In case an instruction is executed by a processor, the processor may perform a function corresponding to the instruction by itself, or using other components under its control. An instruction may include a code made by a compiler or a code executable by an interpreter. A storage medium that is readable by machines may be provided in the form of a non-transitory storage medium. The 'non-transitory' storage medium does not include signals, and is tangible, but does not indicate whether data is stored in the storage medium semi-permanently or temporarily.

According to an embodiment of the disclosure, methods according to the various embodiments described in the disclosure may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., PlayStore™). In the case of on-line distribution, at least a portion of a computer program product may be stored in a storage medium such as the server of the manufacturer, the server of the application store, and the memory of the relay server at least temporarily, or may be generated temporarily.

Each of the components according to the aforementioned various embodiments (e.g., a module or a program) may include a singular object or a plurality of objects. Also, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed in a different order or omitted, or other operations may be added.

While the disclosure has been illustrated and described with reference to various example embodiments, it will be understood that the example embodiments are intended to be illustrative, not limiting. One of ordinary skill in the art will understand that various changes in form and detail may be made without departing from the true spirit and full scope of the disclosure.

What is claimed is:

1. An electronic device comprising:
   a microphone;
   a memory configured to store at least one instruction; and
   a processor configured to execute the at least one instruction,
   wherein the processor is configured to control the electronic device to:
     perform voice recognition using automatic speech recognition for an inquiry and acquire a text corresponding to the inquiry based on receiving inquiry input through the microphone,
     determine whether the acquired text corresponds to a sample inquiry generated based on a relation graph indicating a relation between the acquired text and data stored in a plurality of databases,
     based on determining that the acquired text corresponds to the sample inquiry, generate a plurality of inquiries to acquire response data for the inquiry from the plurality of databases using the acquired text and the relational graph, wherein each inquiry of the plurality of inquiries is related to a corresponding database of the plurality of databases,
     acquire response data corresponding to each of the plurality of inquiries from each of the plurality of databases,
     generate a response for the inquiry based on the response data acquired from each of the plurality of databases, and
     output the response.

2. The electronic device of claim 1,
   wherein the processor is configured to control the electronic device to:
   analyze data fields stored in the plurality of databases and acquire the relation graph indicating a relation among data stored in the plurality of databases.

3. The electronic device of claim 2,
   wherein the processor is configured to control the electronic device to:
   analyze at least one of names of data fields included in the plurality of databases, names of data included in the data fields, or distribution of data and determine similar data fields among the plurality of databases, determine upper concepts of the determined similar data fields, designate the upper concepts as upper nodes, designate the similar data fields as lower nodes of the upper nodes, and acquire the relation graph.

4. The electronic device of claim 3, wherein the processor is configured to control the electronic device to:

generate the sample inquiry and a sample response based on the upper node and store the sample inquiry and the sample response in the memory.

5. The electronic device of claim 4, wherein the processor is configured to control the electronic device to:

generate the response based on the sample response based on acquiring response data from each of the plurality of databases, and output the response.

6. The electronic device of claim 3, wherein the processor is configured to control the electronic device to:

determine the upper nodes corresponding to each of a plurality of inquiry elements included in the acquired text, and generate the plurality of inquiries based on a plurality of lower nodes included in the upper nodes.

7. The electronic device of claim 6, wherein the processor is configured to control the electronic device to:

acquire a plurality of first keywords corresponding to each of the plurality of inquiry elements based on a lower node corresponding to a first database included in the upper node, generate a first inquiry for the first database based on the plurality of first keywords, acquire a plurality of second keywords corresponding to each of the plurality of inquiry elements based on a lower node corresponding to a second database included in the upper node, and generate a second inquiry for the second database based on the plurality of second keywords.

8. The electronic device of claim 1, wherein the processor is configured to control the electronic device to:

determine whether the response is a response generated by integrating the plurality of response data.

9. The electronic device of claim 1, wherein the processor is further configured to control the electronic device to acquire the relation graph including expanding the relation graph using a conventional knowledge graph storing general knowledge.

10. The electronic device of claim 1, wherein the processor is further configured to control the electronic device to:

acquire a plurality of first keywords corresponding to each of a plurality of inquiry elements included in the acquired text based on a lower node the relation graph corresponding to a first database included in an upper node;

generate a first inquiry for the first database based on the plurality of first keywords, acquire a plurality of second keywords corresponding to each of the plurality of inquiry elements based on a lower node the relation graph corresponding to a second database included in the upper node, and generate a second inquiry for the second database based on the plurality of second keywords, wherein the upper node being an upper concept of similar data fields among the plurality of databases.

11. A method for controlling an electronic device comprising:

performing voice recognition using automatic speech recognition for an inquiry based on receiving input inquiry through a microphone, and acquiring a text for the inquiry;

determining whether the acquired text corresponds to a sample inquiry generated based on a relation graph indicating a relation between the acquired text and data stored in a plurality of databases, based at least on determining that the acquired text corresponds to the sample inquiry, generating a plurality of inquiries for acquiring response data for the inquiry from the plurality of databases using the acquired text and the relation graph, wherein each inquiry of the plurality of inquiries is related to a corresponding database of the plurality of databases;

acquiring response data corresponding to each of the plurality of inquiries from each of the plurality of databases;

generating a response for the inquiry based on the response data acquired from each of the plurality of databases; and outputting the response.

12. The method of claim 11, comprising:

analyzing data fields stored in the plurality of databases and acquiring the relation graph indicating a relation among data stored in the plurality of databases.

13. The method of claim 12, wherein the acquiring the relation graph comprises:

analyzing at least one of names of data fields included in the plurality of databases, names of data included in the data fields, or distribution of data;

determining similar data fields among the plurality of databases;

determining upper concepts of the determined similar data fields;

designating the upper concepts as upper nodes;

designating the similar data fields as lower nodes of the upper nodes; and acquiring the relation graph.

14. The method of claim 13, comprising:

generating the sample inquiry and a sample response based on the upper node and storing the sample inquiry and the sample response in memory of the electronic device.

15. The method of claim 14, wherein the outputting comprises:

generating the response based on the sample response based on acquiring response data from each of the plurality of databases, and outputting the response.

16. The method of claim 13, wherein the generating comprises:

determining the upper nodes corresponding to each of a plurality of inquiry elements included in the acquired text; and generating the plurality of inquiries based on a plurality of lower nodes included in the upper nodes.

17. The method of claim 16, wherein the generating comprises:

acquiring a plurality of first keywords corresponding to each of the plurality of inquiry elements based on a lower node corresponding to a first database included in the upper node, and generating a first inquiry for the first database based on the plurality of first keywords; and acquiring a plurality of second keywords corresponding to each of the plurality of inquiry elements based on a lower node corresponding to a second database included in the upper node, and generating a second inquiry for the second database based on the plurality of second keywords.

18. The method of claim 11, further comprising:
determining whether the response is a response generated by integrating the plurality of response data.

* * * * *